Aug. 23, 1960   F. H. LEEUWRIK   2,949,869
TUNNEL BAKING OVEN
Filed June 19, 1956   2 Sheets-Sheet 1
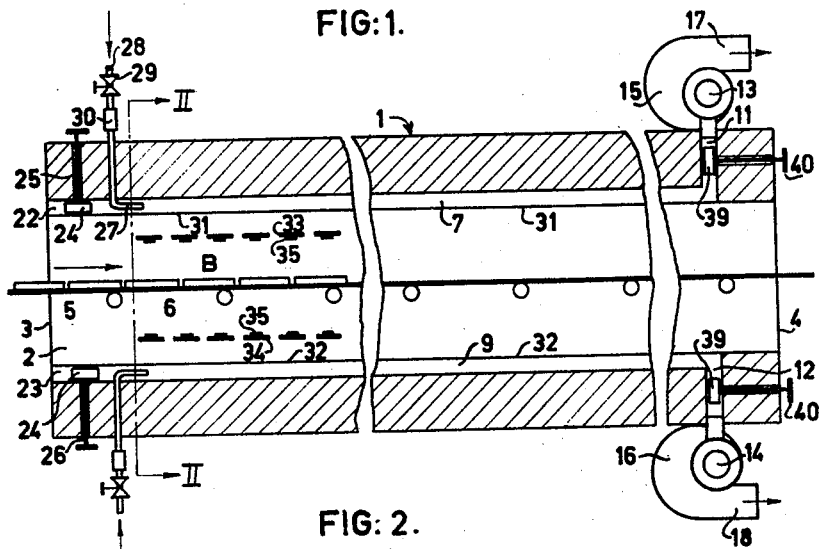
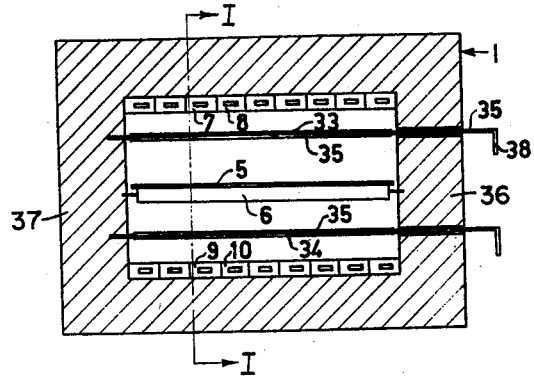
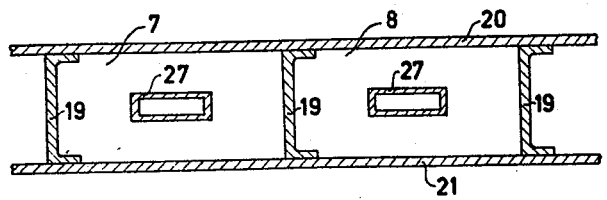
INVENTOR
FREDERIK H LEEUWRIK
BY
ATTORNEY Aug. 23, 1960　　　F. H. LEEUWRIK　　　2,949,869
TUNNEL BAKING OVEN
Filed June 19, 1956　　　　　　　　　　　　2 Sheets-Sheet 2
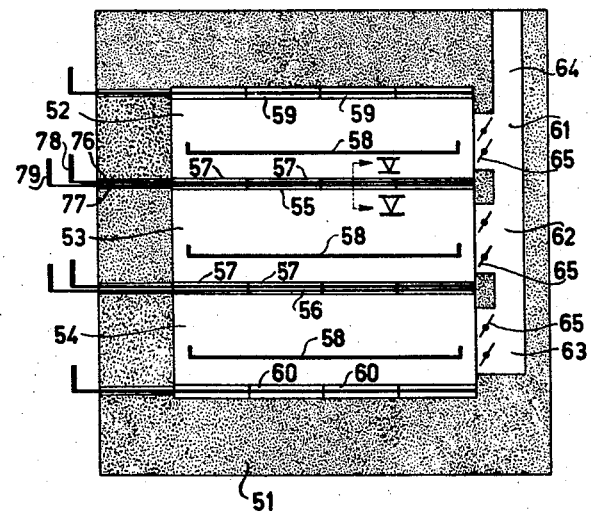
FIG: 4
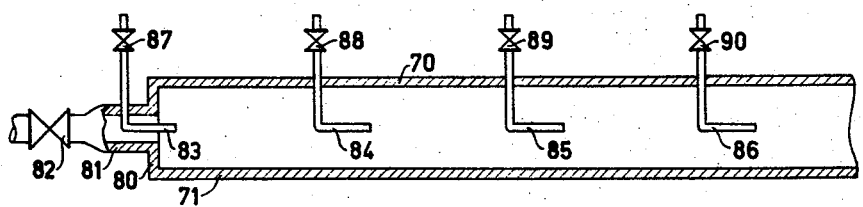
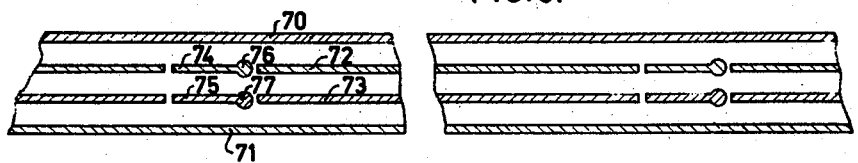
FIG: 6.
FIG: 5
INVENTOR
FREDERIK H LEEUWRIK
BY
ATTORNEY United States Patent Office 2,949,869
Patented Aug. 23, 1960

2,949,869

TUNNEL BAKING OVEN

Frederik H. Leeuwrik, Zaandam, Netherlands, assignor to Koninklijke Verkade Fabrieken N.V., Zaandam, Netherlands, a limited-liability company of the Netherlands Filed June 19, 1956, Ser. No. 592,285

Claims priority, application Netherlands June 20, 1955

4 Claims. (Cl. 107—57)

The invention relates to a tunnel baking oven in which the goods are led from the inlet side to the outlet side through a tunnel having a hot radiating wall and in which hot gases for heating the radiating wall are conducted over the outer side of said wall in the same direction as the goods. For use in baking by means of tunnel ovens two types of ovens have come to be generally employed. In one type gas-flames are arranged in rows transverse to the longitudinal axis of the oven. Such rows of gas burners are arranged at different spots or locations along the total length of the oven. In the other type of existing oven, the latter is formed of several successively arranged parts or sections each provided with its own heating means, circulating system for the heating gases and blower. In each part of the last mentioned oven, hot gases flow from one to the other end through channels and at least part of these gases is removed at the end of the related part of the tunnel. If the temperature at the oven axis is plotted as a function of the distance from the inlet end in said known oven, a curve is obtained which at first rises quickly and afterwards falls slowly, and which, in the regions between adjacent heating devices, indicates temperatures which are lower than the highest temperature obtained in the following heating device.

At the corresponding locations in the oven the temperature is lower than the highest admissible temperature. This means an unnecessarily low production or an unnecessarily great length of the oven with regard to an ideal oven having an ideal distribution of the temperature, the difference being in the order of 15–20%.

It is an object of the invention to provide a tunnel baking oven of the kind referred to above and in which the undesirable fluctuations of the temperature along the oven axis are eliminated in a simple way. According to the invention the hot gases for heating the radiating wall are moved by suction along a continuous flow path for at least seven-eighths of the length of the tunnel.

Further details, features and advantages of the invention will become apparent from the following description with reference to the drawings of two favorable embodiments of the invention.

In the drawings:

Fig. 1 is a longitudinal section of a first tunnel baking oven embodying the invention and taken along the line I—I of Fig. 2;

Fig. 2 is a cross section of the same oven taken along the line II—II of Fig. 1;

Fig. 3 represents an enlarged fragmentary view of the cross section of Fig. 2;

Fig. 4 is a cross section of another tunnel baking oven embodying the invention;

Fig. 5 is an enlarged fragmentary section taken along the line V—V in Fig. 4; and Fig. 6 is a fragmentary section of the inlet part of the gas channel shown in Fig. 5.

The tunnel oven embodying my invention, as shown in Figs. 1 and 2, has an insulating wall 1 incasing a tunnel constituting a baking chamber 2. The oven has an inlet opening 3 and an outlet opening 4. The goods to be baked, for example, cakes, biscuits and the like, are led through the oven in the direction of the arrow D over an endless conveyor belt 5 which moves back under the oven. The belt is supported by rollers 6.

A number of rectangular conduits such as 7, 8, 9 and 10 are mounted above and below, respectively, the conveyor belt 5, directly against the insulating wall 1, the right ends of said conduits such as 7, 8, 9 and 10 being connected with conduits 11 and 12 which extend through the insulating wall 1 and are connected to common discharge pipes 13 and 14. The distance from the outlet pipe 11 to the opening 4 is 4 inches. The total length of the oven, that is the distance between the openings 3 and 4 is however 120 feet. Blowers 15 and 16 maintain a subatmospheric pressure in the pipes 13 and 14. The outlets 17 and 18 of the blowers or fans 15 and 16 communicate with atmosphere, for example, through a chimney. The conduits 7–10, inclusive, have the same construction. The gases are moved by the blowers or fans 15 and 16 over more than 95% of the total oven length along an uninterrupted flow path. The conduits 7 and 8 are shown in Fig. 3 on a larger scale and are constituted by applying vertical partitions 19 between a horizontal upper plate 20 and a horizontal lower plate 21. Each of the conduits 7–10, inclusive, can suck air out of the room in which the oven is placed, through one of nine conduits 22 or one of nine conduits 23.

Each of the conduits 22 and 23 is provided with a vane 24, which can be turned by means of an axle 25 and a crank 26. Each of the conduits 7–10, inclusive, and the other conduits of the same kind is provided with a burner 27 to which a combustible gas is fed through a tube 28 provided with a control valve 29 and an inlet 30 for primary combustion air. Secondary air for supporting the combustion flows to the burners 27 through the channels 22.

The burners can be ignited by ignition devices (not shown) of a construction known per se. All supplies of gas and air are individually adjustable. By a suitable proportion of the quantities of gas, it is possible to assure that a long radiating flame, e.g. having a length of several meters, appears in every conduit. Owing to this the radiating walls 31 and 32 of the conduits 7 and 8 and of the conduits 9 and 10, respectively, facing towards the goods on the belt 5, are brought up to a high temperature for a length corresponding to the length of the flame which in this case is 12 feet. The radiation of the walls 31 and 32 brings the belt 5 and the goods B up to a temperature at which the baking process begins in a time as short as possible, and, thus, a saving of oven length can be obtained. The amount of heat radiated in this part of the oven can be controlled by means of tiltable screening strips 33 and 34 extending across the oven and mounted on bars 35 which are supported in the vertical parts 36 and 37 of the insulating wall 1. The bars 35 are provided with adjusting arms 38. The strips 33 constitute a grid which can be opened and closed and which in closed position reduces the transmission of heat strongly. As the strips are only very small with regard to the length of the oven, the strips do not cause inconvenient fluctuations of the temperature of the baking along the oven axis.

The flue gases of the flames in the conduits 7–10, inclusive, cool gradually during their movement towards the conduits 11 and 12, so that the transmission of heat by radiation of the walls 31 and 32 correspondingly decreases in the direction toward the conduits 11 and 12. For most important types of goods the delivery of heat obtained in this way agrees well with the demand for heat so that some strips 33, 34 need be arranged at only a few places. If only one kind of goods is being baked, the strips 33 and 34 can be arranged rigidly. A short oven of the kind described may have a length of 15 to 20 meters, but this embodiment is also suitable for ovens having a length of 100 meters and more.

It is extremely important that the channels for the hot gases, such as the channels 7–10, inclusive, extend substantially from the inlet end to the outlet end of the oven. Therefore the total amount of heat required for baking of the goods must be led into these channels at or near the inlet end of the oven. In the oven described above the total amount of heat required for the last 108 feet of the oven is accumulated in the gas at the end of the flame. Though in known ovens so large an amount of heat energy accumulation has never been achieved, this leads to the very desirable effect that the temperature along the oven axis decreases continuously between the hottest spot and the outlet end of the oven. This hottest spot is disposed nearly 10 feet from the inlet end 3 of the oven, which is less than one tenth of the total oven length, so that the gases cool down over a distance of more than seven eighths of the total oven length. Although the hot gases contain in the case of long ovens a considerable energy no difficulties arise from this fact, as the temperature of the gas is the factor which determines the rate of radiation. The higher accumulation of heat energy is, however, not obtained by a higher temperature but by a larger volume of hot gas passing through the related conduits in each unit of time. Handling this larger volume is not difficult.

Another important advantage is the possibility of individual control of the total heat energy fed in the unit of time to each of the channels 7–10, inclusive, and the other channels of the same kind. This control and the control of the velocity of the gas streams can be effectuated by the control means 24 and 29 and, if desired, by valves 39 provided with handles 40 in the channels 11 and 12. In this way a uniform rate of baking can be obtained near the oven axis and near the sides of the tunnel.

It is remarked that the total oven length is the distance from the inlet opening 3 to the outlet opening 4, and that the inlet opening 3 is an opening in which the goods to be baked enter as a certain quantity of dough, whereas at the outlet opening 4 the baked goods are absolutely finished and may be cooled down at any rate.

In the embodiment shown in Fig. 4 an insulating wall 51 encloses three baking spaces 52, 53 and 54 which are separated by air tight separating walls 55 and 56. Each separating wall contains four channels 57 for hot gases. The upper and lower sides of the walls 55 and 56, therefore, constitute radiating walls for effecting the baking of the goods which are supported by conveyor belts 58 travelling through the baking spaces 52, 53 and 54.

Channels 59 and 60 for hot gases are arranged at the top of the upper and the bottom of the lower baking spaces, respectively. The channels 57, 59 and 60 extend for the whole length of the oven.

The baking spaces 52, 53, 54 are provided with outlet openings 61, 62, 63 through which vapour evolved from the goods being baked may reach a channel 64 and leave the oven. The openings 61, 62, 63 can be controlled by valves 65. All features mentioned in the embodiment already described may be applied to the embodiment shown in Fig. 4.

It is very important that the vapour in the baking spaces 53 and 54 cannot reach the respective baking spaces 52 and 53. Otherwise, the successful operation of the oven would be upset by uncontrollable heat transport by convection.

In order to obtain a desired distribution of the radiation over the upper and the lower side of the separating walls 55 and 56, each of the channels therein is divided into sub-channels as shown in Fig. 5. Between the upper plate 70 and the lower plate 71 two intermediate plates 72 and 73 are arranged. At regular intervals these plates are interrupted and in the resulting gaps lips 74 and 75 are disposed. The lips 74 and 75 are movable to different positions by means of axles 76 and 77 to which they are attached and which are rotatable by means of cranks 78 and 79 (Fig. 4).

It will be clear that if a section of plate 70 radiates too strongly, its temperature can be lowered by decreasing the flow of gas in the corresponding sub-channel, and this can be achieved by turning upward the lip 74 which is nearest to the overheated section at the upstream side of the latter. By turning the lip 74 downward the reverse effect is obtained. The same effect can be reached with regard to the plate 71 by turning the lip 75 downwards or upwards.

It will be clear that for the channels 59 and 60 which have only a single radiating wall, a division of each channel into two sub-channels is sufficient for obtaining the desired effects.

Passing through an oven according to the invention the temperature in the oven axis rises rather quickly till a point at which the temperature reaches an extreme value and the temperature gradually diminishes over the entire remaining length of the oven. In order to assure that the length of the part of the oven in which the temperature is rising is not too short, it is desirable that the flames in the gas channels have a considerable length. Fig. 6 shows a construction in which a long flame is maintained by means of a number of burners 83–86, inclusive, which are placed in a row in the channel between the radiating walls 70 and 71. The channel is closed by a plate 80 provided with a pipe 81 in which a valve 82 is arranged. Valves 87–90, inclusive, control the burners 83–86, inclusive, respectively. One manner in which this device can be used is to lead a combustible gas to each of the valves 87–90, inclusive, and to allow air to enter through the valve 82.

When the device is put into operation at first only the valves 82 and 87 are open and the gas flowing from the burner 83 is ignited in any known manner. Further the valves 88, 89 and 90 are opened successively, the gas streaming from the burners 84, 85 and 86 being ignited by the flames of the burners 83, 84 and 85. This ignition is only possible if the distance between the burners is relatively short. The total length of the part of the channel containing the burners never exceeds one tenth of the oven length. When the combustible gas is not mixed with primary air the length of the flames can be increased.

Some difficulty is found in operating in this manner when the temperatures have to be varied. In this case the valve 90 is the first valve to be closed, for a further diminishing of the temperature the valve 89 should be closed etc. A simultaneous diminishing of the gas supply by the valves 87–90, inclusive, has the drawback that the ignition of a burner by the preceding burner is upset. Another way of using the device is to lead the combustible gas through the valve 82 and to allow air to enter through the valves 87–90, inclusive, thus introducing an inverted combustion. A control of the heat now can be reached by controlling the valve 82 only.

It is remarked that the inlet end of the hot gas channel containing the burners is not longer than one eighth of the total oven length.

What I claim is:

1. A continuous baking oven comprising at least one tunnel having an entrance end and an exit end, a conveyor entering said tunnel at said entrance end and leaving said tunnel at said exit end for conveying the goods to be baked through said tunnel, rows of parallel tubes disposed above and below said conveyor and all beginning in the same vertical plane at said entrance end of the tunnel and terminating at said exit end of the tunnel, said tubes constituting a roof and floor of the tunnel with the portion of each of said tubes extending from said entrance end of the tunnel along about one tenth to one fifth of the total length of said tunnel constituting a combustion chamber, a fuel burner located in each combustion chamber and having an individually adjustable fuel supply means so that the latter can be adjusted to maintain a uniform temperature gradient across the width of the tunnel, the remaining parts of said tubes following said combustion chambers being heated by the combustion gases and leaving the latter along the length of the tunnel and then to the atmosphere to obtain a gradually falling temperature gradient along the tunnel, suction means maintaining a subatmospheric pressure within said tubes along the whole length thereof, and adjustable screening means interposed in the path of heat flow from said tubes to said conveyor for adaptation of the heat radiation to the goods in consecutive parts of the path of travel of the latter through said tunnel to the desired temperature gradient for the baking process along the length of the tunnel.

2. A continuous baking oven comprising at least one tunnel having an entrance end and an exit end, a conveyor entering said tunnel at said entrance end and leaving the tunnel at said exit end for conveying the goods to be baked through the tunnel, rows of parallel tubes disposed above and below said conveyor and all beginning in the same vertical plane at said entrance end of the tunnel and terminating at said exit end of the tunnel, said tubes constituting a roof and floor of the tunnel with the portion of each of said tubes extending from said entrance end of the tunnel along about one tenth to one fifth of the total length of said tunnel constituting a combustion chamber for a combustible gas and with the end of each of said tubes adjacent said entrance end of the tunnel opening to the atmosphere for admission of combustion air to said combustion chamber, while the remaining part of the length of each of said tubes is heated by the combustion gases travelling therealong for discharge to the atmosphere at said exit end of the tunnel to obtain a gradually falling temperature gradient along the tunnel, suction means maintaining a subatmospheric pressure within said tubes along the whole length thereof, and adjustable screening means interposed in the path of heat flow from said tubes to the conveyor for adaptation of the heat radiation to the goods in consecutive parts of the path of travel of the latter through the tunnel to the desired temperature gradient for the baking process along the length of the tunnel.

3. A continuous baking oven as in claim 2; further comprising transverse separating walls in certain of said tubes forming the floor and roof, respectively, of a pair of superposed tunnels along portions of the latter following said combustion chambers and dividing said tubes into parallel conduits for the combustion gases which are superposed one above the other, said separating walls having pivoted flaps therein which are movable between raised and depressed conditions for directing the combustion gases into the parallel conduits disposed below and above, respectively, the related separating walls, so that, when said flaps direct the combustion gases through parallel conduits at the sides of said separating walls remote from the roof and floor of said superposed tunnels, respectively, the walls of said tubes forming the roof and floor of said superposed tunnels, respectively, act as screens for the heat radiated from said separating walls.

4. A continuous baking oven as in claim 2; wherein a plurality of vertically superposed tunnels are provided each having a conveyor passing therethrough for carrying the goods to be baked; and wherein a row of said tubes defining the floor of a tunnel thereabove also defines the roof of a tunnel therebelow.

References Cited in the file of this patent

UNITED STATES PATENTS

| | | |
|---|---|---|
| 838,270 | Peters | Dec. 11, 1906 |
| 1,857,447 | Engels | May 10, 1932 |
| 2,483,681 | Van der Neut | Oct. 4, 1949 |
| 2,707,925 | Naylor | May 10, 1955 |
| 2,728,387 | Smith | Dec. 27, 1955 |

FOREIGN PATENTS

| | | |
|---|---|---|
| 504,950 | Great Britain | May 3, 1939 |